US009245440B2

(12) United States Patent
Painter

(10) Patent No.: US 9,245,440 B2
(45) Date of Patent: Jan. 26, 2016

(54) LOCATION BASED EVENT NOTIFICATION SYSTEMS AND METHODS

(75) Inventor: Robert Painter, San Diego, CA (US)

(73) Assignee: Airbus DS Communications, Inc., Temecula, CA (US)

( * ) Notice: Subject to any disclaimer, the term of this patent is extended or adjusted under 35 U.S.C. 154(b) by 0 days.

(21) Appl. No.: 13/559,434

(22) Filed: Jul. 26, 2012

(65) Prior Publication Data

US 2014/0032704 A1 Jan. 30, 2014

(51) Int. Cl.

| | |
|---|---|
| ***G06F 15/16*** | (2006.01) |
| ***G08B 31/00*** | (2006.01) |
| ***G08B 27/00*** | (2006.01) |

(52) U.S. Cl.

CPC .............. *G08B 31/00* (2013.01); *G08B 27/006* (2013.01)

(58) Field of Classification Search

CPC ..... H04W 4/021; H04W 4/022; H04W 4/023; H04W 4/025; H04W 4/028; H04W 4/04; H04W 4/043; H04W 4/046; H04W 68/005; H04W 68/04; G01C 13/00; G08B 21/20; G08B 21/12; G08B 21/10; G08B 21/0202; G08B 1/00; G08B 19/005; G08B 19/02; G08B 27/001; G08B 27/003; G08B 31/00

USPC .................................................. 709/217, 224

See application file for complete search history.

(56) References Cited

U.S. PATENT DOCUMENTS

| | | | | |
|---|---|---|---|---|
| 5,937,053 | A | 8/1999 | Lee et al. | |
| 6,049,718 | A | 4/2000 | Stewart | |
| 6,061,561 | A | 5/2000 | Alanara et al. | |
| 6,442,391 | B1 | 8/2002 | Johansson et al. | |
| 6,671,513 | B1 | 12/2003 | Frank et al. | |
| 7,113,795 | B2 | 9/2006 | Somani et al. | |
| 7,174,171 | B2 | 2/2007 | Jones | |
| 7,177,651 | B1 | 2/2007 | Almassy | |
| 7,302,254 | B2 | 11/2007 | Valloppillil | |
| 7,460,020 | B2 * | 12/2008 | Reyes ...................... | G08B 7/06 340/506 |
| 7,505,757 | B2 | 3/2009 | Rowitch et al. | |
| 7,774,139 | B1 * | 8/2010 | Rose et al. ........................ | 702/3 |
| 7,873,366 | B2 | 1/2011 | Chen | |

(Continued)

FOREIGN PATENT DOCUMENTS

| | | | |
|---|---|---|---|
| EP | 1148754 | | 10/2001 |
| WO | WO 2011014558 | A2 * | 2/2011 |
| WO | WO 2011014558 | A3 * | 4/2011 |

OTHER PUBLICATIONS

International Search Report for International Application No. PCT/US2013/052385 dated Nov. 1, 2013.

(Continued)

*Primary Examiner* — Kostas Katsikis

(74) *Attorney, Agent, or Firm* — Knobbe Martens Olson & Bear LLP

(57) ABSTRACT

Spatial notification systems and methods are described. In one respect, a spatial notification system includes a spatial information requesting circuit configured to transmit a request for spatial information, the request including a spatial location. The spatial notification system further includes an association circuit configured to associate received spatial information with notification information and a notification delivery system. The spatial notification system also includes a transmitter configured to transmit at least a portion of the spatial information and associated notification information to a notification delivery system.

28 Claims, 11 Drawing Sheets

(56) References Cited

U.S. PATENT DOCUMENTS

| | | | | |
|---|---|---|---|---|
| 8,090,357 | B2 | 1/2012 | Steel | |
| 8,289,152 | B1 * | 10/2012 | Greenberger | H04Q 9/00 340/5.52 |
| 8,412,231 | B1 * | 4/2013 | White et al. | 455/456.1 |
| 8,600,674 | B1 * | 12/2013 | Barbeau | H04W 4/028 340/988 |
| 8,760,288 | B2 * | 6/2014 | Araiza-Boys | G08B 25/12 340/506 |
| 2003/0139193 | A1 | 7/2003 | Buckley | |
| 2004/0023670 | A1 | 2/2004 | Merheb | |
| 2004/0033803 | A1 | 2/2004 | Varonen et al. | |
| 2004/0072583 | A1 | 4/2004 | Weng | |
| 2004/0152441 | A1 | 8/2004 | Wong | |
| 2005/0043042 | A1 | 2/2005 | Hwang et al. | |
| 2005/0085239 | A1 | 4/2005 | Cedervall | |
| 2006/0059232 | A1 | 3/2006 | Yoshikawa | |
| 2007/0027978 | A1 * | 2/2007 | Burkman | H04L 29/06 709/224 |
| 2007/0044539 | A1 * | 3/2007 | Sabol et al. | 73/19.01 |
| 2007/0140439 | A1 | 6/2007 | Olrik et al. | |
| 2007/0149208 | A1 | 6/2007 | Syrbe et al. | |
| 2007/0202908 | A1 * | 8/2007 | Shaffer | H04W 4/021 455/518 |
| 2007/0214023 | A1 * | 9/2007 | Mathai et al. | 705/4 |
| 2007/0232220 | A1 * | 10/2007 | Moore | 455/3.01 |
| 2007/0297589 | A1 * | 12/2007 | Greischar et al. | 379/201.01 |
| 2008/0020781 | A1 | 1/2008 | Cho | |
| 2008/0155435 | A1 * | 6/2008 | Homa | 715/764 |
| 2008/0316021 | A1 * | 12/2008 | Manz et al. | 340/539.13 |
| 2009/0029672 | A1 * | 1/2009 | Manz | 455/404.2 |
| 2009/0176512 | A1 * | 7/2009 | Morrison | G08G 1/0141 455/456.6 |
| 2009/0216860 | A1 * | 8/2009 | Li et al. | 709/219 |
| 2009/0258636 | A1 * | 10/2009 | Helvick | H04L 12/5895 455/414.2 |
| 2010/0098342 | A1 * | 4/2010 | Davis | G06K 9/6253 382/220 |
| 2010/0131530 | A1 * | 5/2010 | Gibson et al. | 707/758 |
| 2010/0159871 | A1 | 6/2010 | Tester | |
| 2010/0245064 | A1 * | 9/2010 | Fleishman et al. | 340/425.5 |
| 2010/0291950 | A1 * | 11/2010 | Lin et al. | 455/456.3 |
| 2010/0302066 | A1 * | 12/2010 | Talty et al. | 340/905 |
| 2011/0029670 | A1 * | 2/2011 | Klein | H04W 4/02 709/225 |
| 2011/0099049 | A1 * | 4/2011 | Kwiat et al. | 705/7.34 |
| 2011/0099119 | A1 * | 4/2011 | Kwiat et al. | 705/321 |
| 2011/0106592 | A1 | 5/2011 | Stehle et al. | |
| 2011/0169634 | A1 * | 7/2011 | Raj et al. | 340/540 |
| 2011/0218828 | A1 | 9/2011 | Mathai et al. | |
| 2011/0230210 | A1 * | 9/2011 | Drennan | 455/456.3 |
| 2011/0307399 | A1 * | 12/2011 | Holmes | G06Q 30/02 705/319 |
| 2012/0064910 | A1 * | 3/2012 | Cornett | G01S 5/0027 455/456.1 |
| 2012/0156983 | A1 * | 6/2012 | Ortiz | H04N 7/17318 455/3.06 |
| 2012/0197896 | A1 * | 8/2012 | Li et al. | 707/740 |
| 2013/0196685 | A1 * | 8/2013 | Griff | H04L 43/067 455/456.1 |
| 2015/0172860 | A1 * | 6/2015 | Rosenstock | H04W 4/028 455/456.3 |

OTHER PUBLICATIONS

Krishnamurthy, Nandini, "Using SMS to deliver location-based services", Dec. 2002 IEEE International Conference on Personal Wireless Communications.

"The tel URI for Telephone Calls" by Henning Schulzrinne and Antti Vaha-Sipila, Internet Engineering Task Force. Dec. 2004.

* cited by examiner

LOCATION BASED EVENT NOTIFICATION SYSTEMS AND METHODS

BACKGROUND OF THE INVENTION

1. Field of the Invention

The present disclosure relates to notification systems and methods. More specifically, location based event notification systems and methods are described.

2. Description of the Related Art

Events having a potential impact on subjects not directly associated with the event happen almost every day. Some events may simply pass; others may be noteworthy and require a response. Some events happen by accident such as a traffic collision, by design such as a building implosion or military strike, or by nature such as a fire, earthquake, volcanic eruption, or tornado. Events may be associated with a location such as a terrestrial location or a location in space. For certain classes of events, the effect of the events may be predicted and modeled to assist in responding. One aspect of a response may be notifying entities that may be affected by the event.

Atmospheric dispersion prediction and modeling of the effects of an event is a common practice with many algorithms and tools available for accomplishing this such as, for example, the Areal Locations of Hazardous Atmospheres (ALOHA) toolset jointly developed by the National Oceanic and Atmospheric Administration and the Environmental Protection Agency. Atmospheric dispersion modeling may include mathematical simulation of how air pollutants disperse in the ambient atmosphere. In some instances, the modeling may be performed with computer programs to solve mathematical equations and algorithms which simulate the pollutant dispersion. The dispersion models may be used to estimate or to predict the downwind concentration of air pollutants or toxins emitted from sources such as industrial plants, vehicular traffic or accidental chemical releases.

A common practice is to depict the results of an area dispersion predication and modeling calculation as a set of shapes, with each shape depicting a specific range of concentration of an atmospheric dispersion. For example, if a chemical tanker truck is involved in an accident whereby the tank is compromised, chemicals may be leaked into the environment. How this chemical will move in the atmosphere may be modeled.

In some implementations, the information forming the basis for the model (e.g., type of chemical, location of the accident, weather conditions) may be manually entered into the modeling system to obtain the shapes. Accurately and efficiently entering model information is an important aspect of preparing an appropriate response to such events. Furthermore, over time the model may change as conditions regarding the event change. For example, more details about the location may become available which may impact the model output. As another example, the weather may change thereby affecting the model. Maintaining an accurate model as time progresses in an efficient manner is another important aspect of managing such events.

As part of responding to an event, a notification delivery system may be employed. The notification delivery system may be configured to communicate information to an identified group of interested parties. For example, in the chemical tanker accident scenario, providing information to residents or a school near the accident may be desirable. Notification delivery systems generally include an interface to receive an indication of who should receive certain notification messages. As with the modeling information, entering the indication of who should receive which notifications efficiently and accurately is a further important aspect of responding to such events.

Accordingly, improved systems and methods for efficient and accurate notification of relevant entities for predicted and/or modeled location based events are desirable.

SUMMARY

The methods and devices described each have several aspects, no single one of which is solely responsible for its desirable attributes. Without limiting the scope of this disclosure, some features will now be discussed briefly. After considering this discussion, and particularly after reading the section entitled “Detailed Description” one will understand how the features described provide advantages that include improved notification of relevant entities for predicted and/or modeled location based events and other advantages.

In one innovative aspect, a spatial notification system is described. The spatial notification system includes a spatial information requesting circuit configured to transmit a request for spatial information, the request including a spatial location. The spatial notification system further includes an association circuit configured to associate received spatial information with notification information and a notification delivery system. The spatial notification system also includes a transmitter configured to transmit at least a portion of the received spatial information and associated notification information to the notification delivery system.

In some implementations, the spatial information requesting circuit may be configured to periodically transmit requests for the spatial information. In some implementations, the spatial notification system may include a reconciliation circuit. The reconciliation circuit may be configured, in some implementations, to reconcile initial spatial information received at a first period of time with subsequent spatial information received at a second period of time. For example, reconciliation may include identifying an area covered by the initial spatial information and the subsequent spatial information. Reconciliation may include identifying an area covered by the initial spatial information only. In some implementations, reconciliation may include identifying an area covered by the subsequent spatial information only.

In some implementations, the transmitter may be configured to transmit the area covered by the spatial information, or a portion of the spatial information, to a notification delivery system. The reconciliation circuit may be configured, in some implementations, to include an indication of one of increased risk relative to the first period, decreased risk relative to the first period, or stable risk relative to the first period for subsequent spatial information. The indication may be based at least in part on the request for the spatial information. For example, if the request for spatial information includes modeling information including zones of concentration, the zones of concentration may correspond to varying levels of danger/risk.

In some implementations, the shape requesting circuit may be configured to transmit a request to at least one of an atmospheric dispersion modeling system, a seismic modeling system, a fire modeling system, a weather modeling system, a military modeling system, and an orbital modeling system. The spatial information requesting circuit may, in some implementations, transmit a request including at least one of a windspeed, a cause of an event, a topography, demographics, and a frequency.

Some spatial notification systems may include an approval circuit configured to receive a signal authorizing the association between the received spatial information and the notification information, wherein the transmitter is configured to transmit at least a portion of the received spatial information and associated notification information to a notification delivery system after approval. In some implementations, the association circuit may be configured to associate another portion of the received spatial information with another notification delivery system. The transmitter may be configured to transmit the other portion of received spatial information to the other notification delivery system.

The received spatial information may be of several forms. For example, the received spatial information may include information identifying a two dimensional shape. The received spatial information may include information identifying a three dimensional shape.

The notification information may include at least one of a notification message, an indication of risk, a notification priority, and a notification event.

In a further innovative aspect, a method of spatial notification is provided. The method includes transmitting a request for spatial information based at least in part on a geospatial location. The method further includes receiving the spatial information. The method also includes associating the spatial information with notification information and a notification delivery system. The method also includes transmitting at least a portion of the spatial information and associated notification information to the notification delivery system.

In some implementations, transmitting the request for spatial information includes periodically transmitting a request for the spatial information. In some implementations, the method also includes reconciling initial spatial information received at a first period of time with subsequent spatial information received at a second period of time. Reconciling may include identifying an area covered by the initial spatial information and the subsequent spatial information. Reconciling may include identifying an area covered by the initial spatial information only. In some implementations, reconciling may include identifying an area covered by the subsequent spatial information only.

The method, in some implementations, may transmit the area covered by the subsequent spatial information only and the associated notification information to the notification delivery system. In some implementations, reconciling may include an indication of one of increased risk relative to the first period, decreased risk relative to the first period, or stable risk relative to the first period for the subsequent spatial information. The indication may be based at least in part on the request for spatial information.

In some implementations, transmitting a request for spatial information includes transmitting a request to at least one of an atmospheric dispersion modeling system, a seismic modeling system, a fire modeling system, a weather modeling system, a military modeling system, and an orbital modeling system. In some implementations, the request for spatial information includes at least one of a wind speed, a wind direction, a cause of an event, a topography, demographics, and a frequency.

In some implementations, the method also includes receiving a signal authorizing the association between the spatial information and the notification information. Transmitting to a notification delivery system may include transmitting the at least a portion of the spatial information and associated notification information to a notification delivery system after approval.

The method may also include associating and transmitting another portion of the spatial information and associated notification information to another notification delivery system.

As discussed above, the spatial information may include information identifying a two dimensional shape or a three dimensional shape. In some implementations, the method may include both. In some implementations, the notification information includes at least one of a notification message, a notification priority, an indication of risk, a notification event.

In a further innovative aspect, a computer-readable storage medium comprising instructions executable by a processor of an apparatus are provided. The instructions cause the apparatus to transmit a request for spatial information based at least in part on a geospatial location. The instructions further cause the apparatus to receive the spatial information. The instructions also cause the apparatus to associate the spatial information with notification information and a notification delivery system. The instructions additionally cause the apparatus to transmit at least a portion of the spatial information and associated notification information to the notification delivery system.

In yet another innovative aspect, a further spatial notification system is provided. The system includes means for transmitting a request for spatial information based at least in part on a geospatial location. The system includes means for associating the received spatial information with notification information and a notification delivery system. The system includes means for transmitting at least a portion of the received spatial information and associated notification information to the notification delivery system.

DETAILED DESCRIPTION

Various aspects of the novel apparatuses and methods are described more fully hereinafter with reference to the accompanying drawings. The apparatuses and methods described herein may, however, be implemented in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel apparatuses and methods disclosed herein, whether implemented independently of or combined with any other aspect of the disclosure. For example, an apparatus may be implemented or a method may be practiced using any number of the aspects set forth herein. In addition, the scope of the description is intended to cover such an apparatus or method which is practiced using other structure, functionality, or structure and functionality in addition to or other than the various aspects set forth herein. It should be understood that any aspect disclosed herein may be implemented by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to other spatial notification systems or methods. The detailed description and drawings are merely illustrative of the disclosure rather than limiting, the scope of the disclosure being defined by the appended claims and equivalents thereof.

Figure 1:
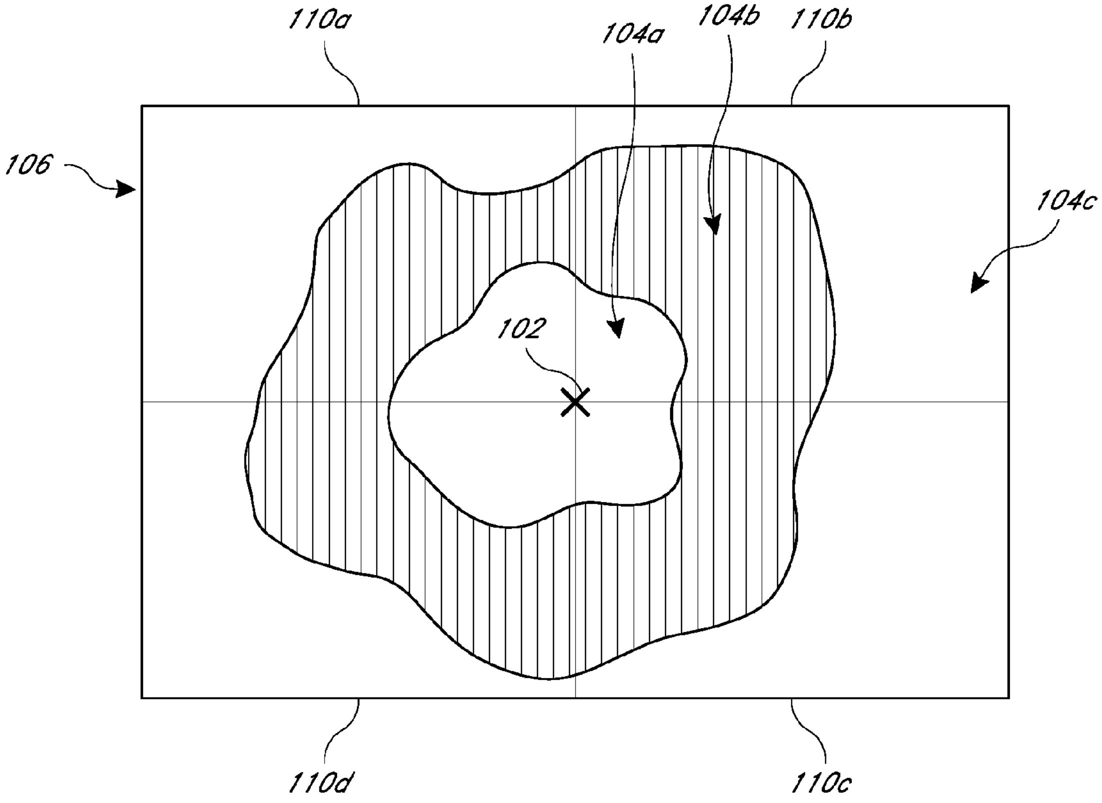
FIG. 1 illustrates a model of predicted outcomes for an event.

FIG. 1 illustrates a model of predicted outcomes for an event. The model shown in FIG. 1 may be generated based on an event 102 occurring at a location. The event 102 may be a chemical spill, an earthquake epicenter, orbital event (e.g., asteroid, satellite orbital collision) a criminal event (e.g., bank robbery, hostage situation, abduction, bomb threat), a target (e.g., building, military installation, satellite, aircraft), or any other occurrence that may be spatially located in two or three dimensional space.

As discussed above, a given event may exhibit generally predictable characteristics. For example, if the event 102 is a chemical spill, where and how the chemicals disperse may be modeled to predict where the spill may travel based on factors such as terrain, weather, wind speed, wind direction, structures, roads, and the like. The dispersion may be an aerial dispersion of chemical gasses. The dispersion may be a ground dispersion of the chemical into the earth. The dispersion may also include secondary effects such as ash or smoke from a fire.

By providing such details about the event 102, a modeling system may generate a model including one or more zones such as zones 104*a*, 104*b*, and 104*c* (individually or collectively hereinafter referred to as 104) shown in FIG. 1. The zones 104 may represent varying degrees of effect based on the event. For example, in a model of a chemical spill, the zones 104 may represent an estimated concentration (e.g., parts per million) of the chemical over a period of time (e.g., thirty minutes). The first zone 104*a* which includes the location of the event 102 may be a zone associated with the highest concentration of the chemical. The second zone 104*b* which surrounds the first zone 104*a* may be a zone associated with a level of concentration lower than the first zone 104*a*, but still within a range that may be of interest to entities located within the second zone 104*b*. The third zone 104*c* which surrounds the second zone 104*b* may be a zone associated with a level of concentration lower than the second zone 104*b*, but still within a range that may be of interest to entities located within the third zone. The model may include an outer boundary 106. The outer boundary 106 may represent the outer limit of an effect caused by the event 102. For example, the event 102 may have a predicted effect of one hundred square miles. In such implementations, the area outside the specified one hundred square miles may not be of interest for notification purposes.

However, the zones 104 within the area covered by the model may be of interest. Because each of the zones 104 is associated with a different level of potential "risk" the zone information may be used to generate notifications to entities located within the zone. The entities located within a zone may be household, mobile phone subscribers, military units, civil servants (e.g., fire, police, EMT), autonomous machines (e.g., drones, sensors), or any further entity which may need to respond as a result of the event 102.

Each zone 104 may be represented by spatial information such as a shape. The spatial information may include one or more polygons, point radius circles, points, way-points, vectors, or other spatial representations. The spatial information may be provided to a notification system as a basis to generate and execute notifications to the entities within a zone. As the event 102 may produce multiple zones 104, multiple elements of spatial information (e.g., shapes) may be provided to the notification system.

As discussed above, notification delivery systems may provide notifications for a specific area. Where one notification delivery system's area of responsibility ends, another's may begin. As shown in FIG. 1, the model may span four notification delivery systems 110*a*, 110*b*, 110*c*, and 110*d* (individually or collectively hereinafter referred to as 110). Each notification delivery system 110 may be configured to transmit notifications to entities within its service area. Accordingly, for the event 102 shown in FIG. 1, the zones 104 may be further divided such that only notification information and spatial information representing the portion of the zone 104 within the service area of a notification delivery system 110 are provided to the associated notification delivery system 110. Accordingly, each zone for the event 102 modeled in FIG. 1 is divided into four areas, each corresponding to a notification delivery system 110.

Figure 2:
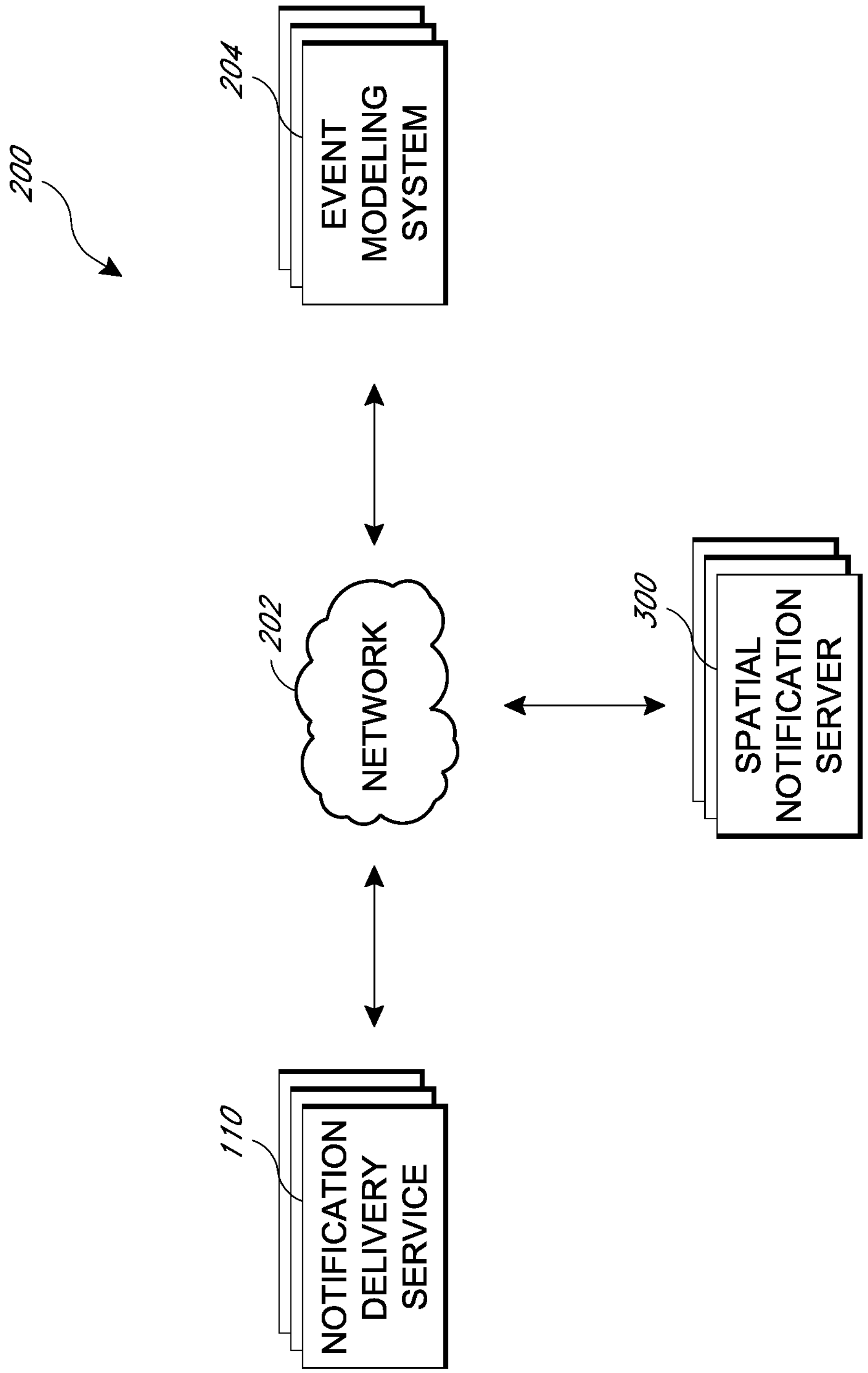
FIG. 2 shows a functional block diagram of a notification network.

FIG. 2 shows a functional block diagram of a notification network. The notification network 200 includes a one or more notification delivery systems 110. The notification delivery systems 110 may be associated with an area of responsibility. The area of responsibility may be a township, a city, a district, a sector, a theater of operation, an airspace, or any other demarcated area. The notification delivery systems 110 may be configured to send notifications to entities within the area of responsibility. For example, the notification delivery systems 110 may send telephone calls, text messages, multimedia messages, blog or micro-blog messages, social media status updates, video calls, or other messaging formats to the entities within the area of responsibility. As a non-limiting example, a notification delivery system 110 may include an emergency alert system which is configured to contact identified households via phone during an emergency situation.

In some implementations, the notification delivery systems 110 may include software or hardware configured to identify which entities will receive a particular message. These components may include receiving one or more signal (e.g., via user interaction with an interface) to define the notification information used to generate the notifications. In time critical emergencies and/or for emergencies that cross areas of responsibility, generating the notification information can be labor intensive, time consuming, and prone to errors.

As shown in FIG. 2, the notification delivery systems 110 may be coupled with a network 202 (e.g., satellite, LAN, WAN, cellular, peer-to-peer). The network 202 may be a public network (e.g., the Internet), or a private network (e.g., VPN). Information can be exchanged with the network 202 using appropriate and known network transmission protocols (e.g., TCP/IP, Bluetooth).

Via the network 202, the notification delivery systems 110 may be configured to communicate with a spatial notification server 300. The spatial notification server 300 may be configured to generate notification information for events such as the event modeled in FIG. 1. The spatial notification server 300 will be described in further detail below.

The spatial notification server 300 may be configured to communicate with one or more event modeling systems 204 such as via the network 202. The event modeling systems 204 may be configured to receive event information and generate a model including spatial information for the event. For example, as discussed above, the event modeling systems 204 may include chemical spill modeling systems, seismic modeling systems (e.g., earthquakes, tsunamis), collateral damage modeling systems, ordinance dispersion modeling systems, collision modeling systems, criminal event modeling system, and the like.

As will be described in further detail below, the spatial notification server 300 may be configured to receive event information and cause the generation of one or more models from the event modeling systems 204. Using the model information, the spatial notification server 300 may be configured to transmit the appropriate spatial information and associated notification information to the associated notification delivery systems 110. The notification information may include one or more of a notification message, a notification message type, a threat level, general text information, or other information associated with the event.

Figure 3:
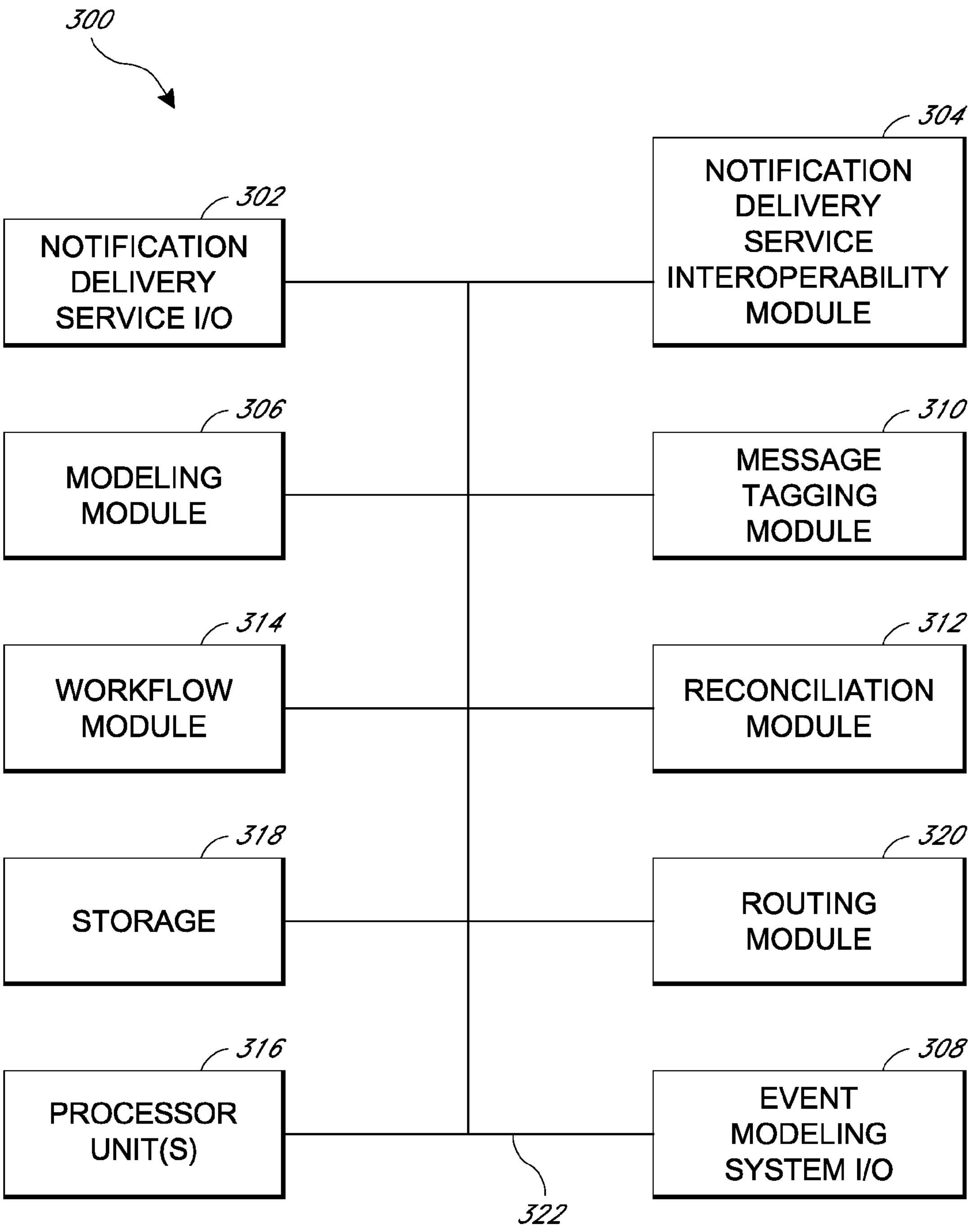
FIG. 3 illustrates a functional block diagram of a spatial notification server.

FIG. 3 illustrates a functional block diagram of a spatial notification server. The spatial notification sever 300 shown in FIG. 3 includes a notification server interface circuit 302. The notification server interface circuit 302 may be configured to communicate with the notification delivery systems 110. The communication may originate at the spatial notification server 300. For example, if the spatial notification server 300 has identified spatial information associated with a notification delivery system 110, information such as the spatial information and/or notification information may be transmitted via the notification server interface circuit 302. The notification server interface circuit 302 may include a transmitter to send the information. The transmitter may be configured to further process the information such as by compression, encryption, failure/retry, and the like.

The notification server interface circuit 302 may be configured to receive communications originating at a notification delivery system 110. For example, a notification delivery system 110 may transmit an acknowledgment that transmitted information was successfully received. The notification server interface circuit 302 may receive such acknowledgment and provide the information for use by other elements of the spatial notification server 300.

The notification server interface circuit 302 may be configured to receive information indicating the available notification delivery systems 110. For example, a notification delivery system 110 may register with a spatial notification server 300 via the notification server interface circuit 302. The registration may include receiving a license key, authentication information, identification information (e.g., textual name for the service, spatial information identifying the area of responsibility, point of contact information), capability information (e.g., supported spatial information formats, supported notification information formats), and other characteristics of the notification delivery system. This registration information may be received by the notification server interface circuit 302 and stored in a storage 318 included in the spatial notification server for further processing (e.g., validation, processing transmission).

In some implementations, the spatial notification server 300 may include a notification server interoperability module 304. The notification server interoperability module 304 may be configured to transform communications received from a notification delivery system or communications to be transmitted to a notification delivery system. The transformation may be based at least in part on the registration information associated with the notification delivery system. For example, a notification delivery system may indicate that spatial information is represented as point radius circles. Accordingly, prior to transmitting spatial information and associated notification information, the notification server interoperability module 304 may be configured to convert the spatial information to include point-radius circles. In some implementations, the converted data may be stored in the storage 318.

In the implementation shown in FIG. 3, the spatial notification server 300 includes a modeling circuit 306. The modeling circuit 306 may be configured to receive one or more signals including event information that will serve as the basis for the model. The modeling circuit 306 may be configured to store the signals in the storage 318. The modeling circuit 306 may be configured to receive event information such as location of the event and the type of event (e.g., accident, explosion, tornado, earthquake, bomb strike, collision). In some implementations, the modeling circuit 306 may be configured to provide an interface (e.g., graphical user interface) to assist in obtaining the event information. For example, the modeling circuit 306 may receive a first signal indicating that the event is a chemical spill. In response, the modeling circuit 306 may indicate location, wind speed, wind direction, and temperature as inputs for a chemical spill model. In some implementations, the modeling circuit 306 may receive information about a model information data source. For example, a weather service may be used to provide inputs to a modeling system. In such an implementation, rather than receive inputs from, for example, a user interface, the input information can be obtained from the data source. This may further reduce errors and increase the efficiency of the system.

In some implementations, the modeling circuit 306 may be configured to validate values received. For example, the modeling circuit 306 may identify a spatial coordinate which is beyond the possible values. Accordingly, this may further reduce errors and increase the efficiency of the system. Examples of various aspects of an interface to the modeling circuit 306 will be described below.

The spatial notification system 300 may include an event modeling system interface circuit 308. The event modeling system interface circuit 308 may be configured to transmit signals to an event modeling system. For example, the event modeling system interface circuit 308 may be configured to transmit at least a portion of the received event information to generate a model. In some implementations, the event modeling system interface circuit 308 may obtain the event information from the storage 318. In some implementations, the event modeling system interface circuit 308 may receive the event information from the modeling module 306. As part of transmitting the event information, the event modeling system interface circuit 308 may be configured to manage aspects of the transmission such as login, authentication, encryption, compression, fail/retry, and the like. The event modeling system interface circuit 308 may include a transmitted to communicate with the event modeling system. The transmitter may be configured to transmit via wired and/or wireless communication pathways.

The event modeling system interface circuit 308 may be configured to receive signals from an event modeling system. For example, the event modeling system interface circuit 308 may be configured to receive a model generated by the event modeling system. In some implementations, the event modeling system interface circuit 308 may be configured to store the received information in the storage 318 for further processing by the spatial notification server 300. As part of receiving the model, the event modeling system interface circuit 308 may be configured to manage aspects of the reception such as decryption, decompression, fail/retry, and the like. The event modeling system interface circuit 308 may include a receiver to communicate with the event modeling system. The receiver may be configured to receive via wired and/or wireless communication pathways. In some implementations, the transmitter and the receiver may be combined in a transceiver.

The spatial notification server 300 may include a message tagging circuit 310. The message tagging circuit 310 may be configured to receive one or more signals identifying notification information to associate with portions of a model. For example, the model request may include a request for three zones. Each zone may be associated with distinct notification information. Consider, as one example, an earthquake event. The earthquake event may cause the request for a model of the possible aftershocks within the next thirty minutes. The request may specify three levels of risk 60%-100% chance of aftershock, 30%-59% chance of aftershock, and 0%-29% chance of aftershock. Each level of risk may then be associated with a different message. For example, the high risk zone of the model may be associated with (e.g., "tagged") with a message indicating the likelihood of an aftershock and other information about the event (e.g., turn your gas off, look for foundation cracks, avoid downed power lines). Similarly, the reduced risk zones may include unique messages tailored to the associated modeled risk. Accordingly, the single event may be associated with one or more messages depending on the model zone. The message tagging circuit 310 receives the information associating the notification information with zones of the model. The message tagging circuit 310 may be configured to provide an interface to facilitate receipt of the signals tagging a model. An example of such an interface will be described in further detail below.

The spatial notification server 300 may include a reconciliation module 312. The reconciliation module 312 may be configured to reconcile received event modeling information. For example, the spatial notification server 300 may receive a first model at a first period of time. At a second period of time, a second model may be received. The reconciliation module 312 may be configured to compare the two models and generate notification information based on this information. The reconciliation process will be described in further detail below.

In some implementations, the spatial notification server 300 may include a workflow module 314. The workflow module 314 may be configured to coordinate one or more functions of the spatial notification server. For example, the workflow module 314 may delay sending an event modeling request until the request is reviewed by an authorized entity. In some implementations, the workflow module 314 may be configured to allow review of the notification information associated with portions of a model (e.g., message tagging) for an event. Accordingly, transmission of all or part of a modeling request or notification information may be based on an authorization. The workflow module 314 may automate tasks. For example, the workflow module 314 may be configured to monitor when an event modeling request was transmitted and generate a message to notification delivery systems that potential notification information will be transmitted. As such, the workflow module 314 may be configured to further automate tasks involved in generating and disseminating event based notifications. This provides a non-limiting benefit of increasing efficiency during time critical events.

The spatial notification server 300 may include a processor unit(s) 316. The processor unit(s) 316 may control operation of the spatial notification server 300. One or more of the processor unit(s) 316 may be collectively referred to as a central processing unit (CPU). Storage 318, which may include read-only memory (ROM) and/or random access memory (RAM), provides instructions and data to the processor unit(s) 316. A portion of the storage 318 may also include non-volatile random access memory (NVRAM). The processor unit(s) 316 may be configured to perform logical and arithmetic operations based on program instructions stored within the storage 318. The instructions in the storage 318 may be executable to implement the methods described herein. The processor may be configured to transmit signals to one or more of the components of the spatial notification server 300. The processor may also be configured to receive signals from one or more of the components of the spatial notification server 300.

The processor unit(s) 316 may be implemented with any combination of general or special purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The spatial notification server 300 may include a routing module 320. The routing module 320 may be configured to identify the notification delivery system for a particular portion of the spatial information and associated notification information. The routing module 320 may be configured to identify the notification delivery system for a portion of the spatial information by querying a geospatial database for the notification delivery system having an area of responsibility overlapping with the area identified by the spatial information.

The routing module 320 may be further configured to identify the order in which notification information will be transmitted to the notification delivery systems. For example, two notification delivery systems may be identified as covering an area associated with an event. The first notification delivery system may cover a sparsely populated area while the second notification delivery system may cover an area more densely populated than the area associated with the first notification delivery system. Accordingly, the routing module 320 may be configured to indicate the transmission to the second notification delivery system should be initiated before the transmission to the first notification delivery system. The routing module 320 may be configured to base the transmission order on information associated with the notification delivery systems (e.g., at registration) such as population, response capabilities (e.g., type, quantity, location), notification capabilities (e.g., type, quantity, load), and service level agreement. The information serving as the basis for the transmission order may be provided to the spatial notification system (e.g., via an interface, memory, or network) The information may be provided by the notification delivery systems (e.g., at registration). In some implementations, the information serving as the basis for the transmission may be obtained from the event such as the spatial information (e.g., size of shape included, sensitivity of an area included within a shape (e.g., school, government building)).

The elements of the spatial notification server 300 may be coupled by a bus 322. The bus 322 may be a data bus, communication bus, or other bus mechanism to enable the various components of the spatial notification server 300 to exchange information. It will further be appreciated that while different elements have been shown, multiple processes may be combined into a single element, such as the notification delivery system I/O interface and the notification delivery system interoperability module, or a combination of processors into a single element.

Figure 4:
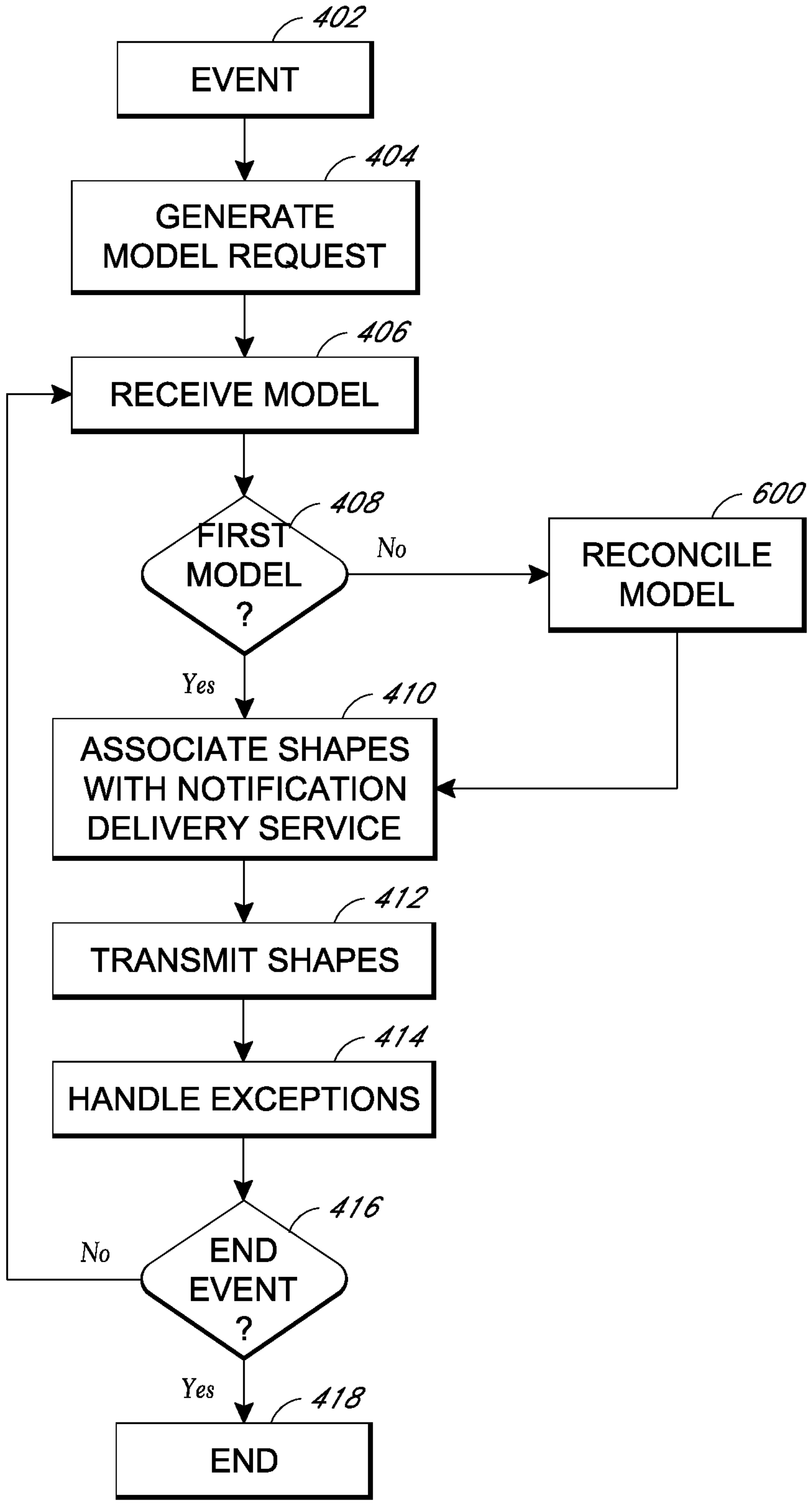
FIG. 4 illustrates a process flow diagram of an example of a method for generating spatial notifications.

FIG. 4 illustrates a process flow diagram of an example of a method for generating spatial notifications. The process shown may be implemented by one or more devices described herein, such as the spatial notification server of FIG. 2 above and FIG. 11 below. The flow begins at block 402 where information about an event may be obtained. The information may be obtained through an automated interface. For example, the information may be transmitted from an emergency response center. The information may include a location, an event type, an event identifier, and a time of the event. In some implementations, the information may be received through a user interface.

At block 404, an event modeling request may be generated. As described herein, the modeling request may be generated using a user interface, an automated interface, or other suitable data extraction method. The event modeling request may be based at least in part on the received event information. Additional modeling parameters may be provided such as weather conditions, time period to model, spatial information calibration (e.g., ranges of event effect to define shapes), a modeling request identifier, units (e.g., mile, kilometers) and how often to generate a model (e.g., every 30 minutes, every 60 minutes). In some implementations the event modeling request may also include notification information to associate with the spatial information included in the model. The request information may be stored in a storage of the spatial notification server. The event modeling request may include transmitting the event model to an event modeling system.

At block 406, the event model may be received. The event model may include an event identifier or a model request identifier. The identifier may be used to correlate a received model with an event and/or request. In some implementations, the spatial notification server may be processing multiple events. In such a situation, it may be desirable for the information (e.g., event, model requests, models) for each event to be correlated. In some implementations, the received model information is stored in a storage.

At decision block 408, a determination may be made as to whether the received model is the first model for this event. If the model is the first instance for an event, at block 410 the model is parsed to associate spatial information with identified notification delivery systems. The notification delivery systems may register with the spatial notification server. In some implementations, the notification delivery systems may be provided to the spatial notification server. As discussed herein, each notification delivery system may be associated with an area of responsibility. The area of responsibility for each notification delivery system included in the model may be used to parse spatial information associated with the portion(s) of the model corresponding to each notification delivery system.

At block 412, the notification information may be transmitted to the notification delivery systems which service at least one portion of the spatial information from block 410. The transmission of the notification information may be via network communication (e.g., TCP/IP, PSDN, PSTN, satellite, cellular, optical). The transmission may include compression of the notification information, encryption of the notification information, or altering the notification information, such as describe above in reference to the interoperability module.

At block 414, any exceptions generated during the process may be handled. An exception generally refers to an error during processing that may not be resolved without special handling. For example, if the spatial notification server is configured such that two notification delivery systems have an overlapping area of responsibility, the associating of block 410 may not be configured to determine the appropriate server to associate with a portion of the spatial information. The exceptions may be resolved through a user interface. For example, in the overlapping notification delivery systems situation, the exception may be handled by receiving an identifier for the notification delivery system which is responsible for the area in question. It should be noted that in some implementations, if an exception is generated, the exception may be associated with a spatial location (e.g., a shape). In some implementations, the exception spatial location may be provided for handling.

At decision block 416, a determination may be made as to whether the event is ended. If the event is over, the flow ends at block 418. If the event is not over, the flow may return to block 406 to receive a subsequent model for the event. In some implementations, additional information about the event may be received. In such implementations, the model request may be altered to include the new information. The process may continue as described until the event is ended.

Returning to decision block 408, if the model received is not the first model, at block 600 the received model may be reconciled with one or more previously received models. Reconciling will be described in further detail below. After reconciliation, the process continues at block 410 as described above.

Figure 5A:
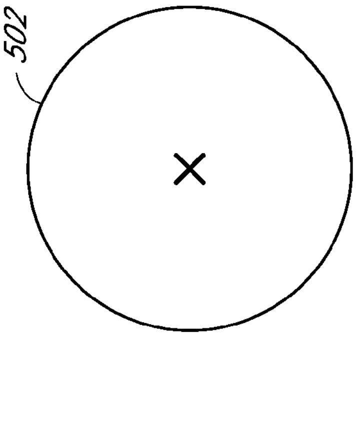
FIGS. 5A-5C illustrate exemplary models received over time for an event.
Figure 5B:
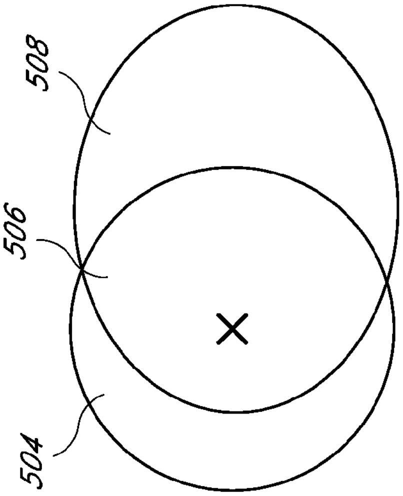
Figure 5C:
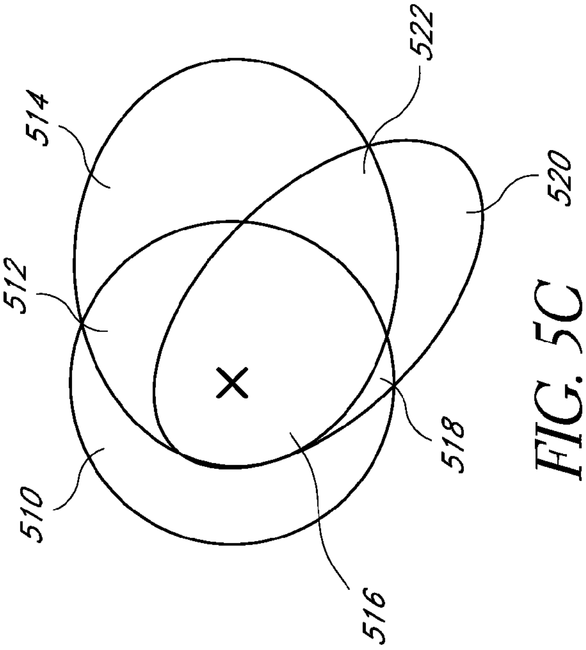

FIGS. 5A-5C illustrate exemplary models received over time for an event. Each figure represents a subsequent period of time for the event. FIG. 5A shows an event model including one shape 502. As discussed above, notification information for this shape may be generated by the spatial notification server and transmitted to the appropriate notification delivery system.

If the shape of FIG. 5A represents a chemical spill event, the notification information transmitted may be "Chemical spill nearby, please stay indoors."

FIG. 5B shows a combination of a second model with the first event model. As shown, the second event model includes one shape, but when overlaid with the previous event model, three shapes result. Shape 504 represents an area that was previously within the event effect range, but has been removed at the second time period. Shape 506 represents an area that was within the effect range previously, and remains in the event effect range at the second time period. Shape 508 represents an area that was not previously within the event effect range, but has been added at the second time period.

If the shapes of FIG. 5B represent a chemical spill event, Table 1 illustrates hypothetical notifications that may be transmitted. It should be noted that no new message need be transmitted to those in shape 506 as this area was previously identified by FIG. 5A. While the example states no new message transmitted, the previous notification information may be retransmitted to the appropriate notification delivery system.

TABLE 1

| SHAPE | MESSAGE | RISK RELATIVE TO PREVIOUS PERIOD |
|---|---|---|
| 504 | "No longer in danger." | Decrease |
| 506 | No new message transmitted | Stable |
| 508 | "Chemical spill nearby, please stay indoors." | Increase |

FIG. 5C shows a combination of a third event model with the second event model and with the first event model. As shown, the third event model includes one shape, but when overlaid with the previous event models, seven shapes result. Shape 510 represents an area that was previously within the event effect range in the first event model, but has been removed since the second time period. Shape 512 represents an area that was within the effect range in the first and second event models, but is not within the effect range of the third event model. Shape 514 represents an area that was within the effect range of the second event model, but is not within the effect range of the third event model. Shape 516 represents an effect range within all three event models. Shape 518 represents an effect range that was within the first event model, removed in the second event model, and added in the third event model. Shape 520 represents an effect range appearing in the third event model. Shape 522 represents an effect range within the second and third event models.

If the shapes of FIG. 5C represent a chemical spill event, Table 2 illustrates hypothetical notifications that may be transmitted.

TABLE 2

| SHAPE | MESSAGE | RISK RELATIVE TO PREVIOUS PERIOD |
|---|---|---|
| 510 | No new message transmitted | Stable |
| 512 | "No longer in danger." | Decrease |
| 514 | "No longer in danger." | Decrease |
| 516 | No new message transmitted | Stable |
| 518 | "Chemical spill nearby, please stay indoors." | Increase |
| 520 | "Chemical spill nearby, please stay indoors." | Increase |
| 522 | No new message transmitted | Stable |

In some implementations, the notification information may be generalized into notification types. The notification types may be "initial notification," "stable situation notification," "increased risk notification," "decreased risk notification," and "all clear notification." The notification types are provided as examples, and in some implementations fewer or additional types may be included. The notification types may be included in the notification information transmitted to the notification delivery systems. The notification delivery systems may use the notification type to select an appropriate notification message/medium for the notification information. For example, in an earthquake event, a notification delivery system with a marine area of responsibility may provide different information than a land based notification delivery system. Accordingly, the "initial notification" notification type for the marine notification delivery system may be "Potential tsunami, baton down the hatches" while the notification type for the land based notification delivery system may be "Potential tsunami, head for higher ground."

Figure 6:
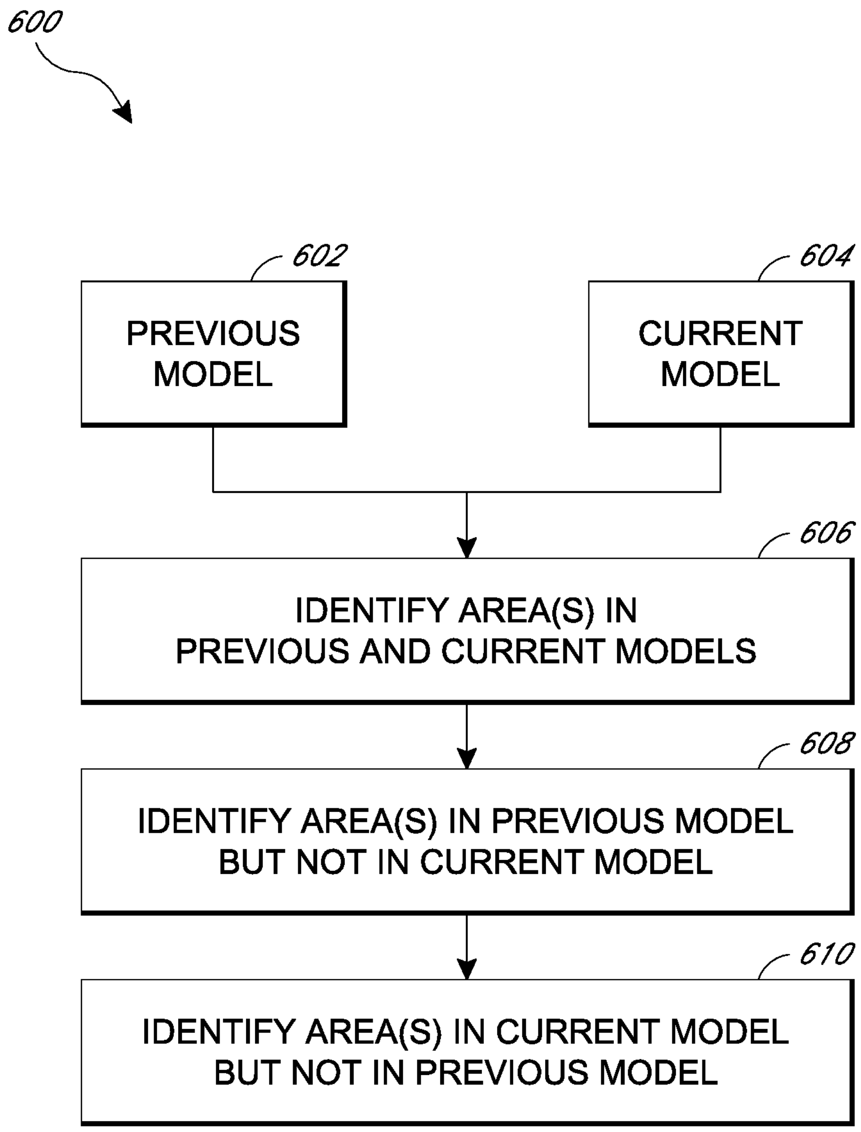
FIG. 6 illustrates a process flow diagram of an example reconciliation process.

FIG. 6 illustrates a process flow diagram of an example reconciliation process. The process may receive a previous event model 602 and a current event model 604 as inputs. The inputs may be stored in storage associated with the spatial notification server. It will be appreciated that the process described may accept a plurality of models for the reconciliation process.

At block 606, one or more areas in both the previous event model 602 and the current event model 604 may be identified. The areas may be stored in a storage associated with the spatial notification server. In some implementations, if these areas cover the same effect range, the areas may be associated with a "stable situation notification" notification type. If an area in the current event model 604 covers a lower effect range relative to the previous event model 602, the area may be associated with a "decreased risk notification" notification type. If an area in the current event model 604 covers a higher effect range relative to the previous event model 602, the area may be associated with an "increased risk notification" notification type.

At block 608, one or more areas in the previous event model 602 but not in the current event model 605 are identified. The areas may be stored in the storage associated with the spatial notification server. In some implementations, the area may be associated with an "all clear notification" notification type.

At block 610, one or more areas in the current event model 605 but not in the previous event model 602 may be identified. The areas may be stored in the storage associated with the spatial notification server. In some implementations, the area may be associated with an "initial notification" notification type.

The identification of areas may be performed by comparing initial spatial information associated with an area to subsequently received spatial information associated with the area. The identification may be performed on a shape level or point by point. In some implementations, the spatial information may be decomposed into smaller shapes and used for comparison. In some implementations, the reconciliation may be performed before the spatial information is associated with notification delivery systems. In some implementations, the reconciliation may be performed after the spatial information is associated with notification delivery systems. In such implementations, the reconciliation may be performed on a per-shape, per-notification delivery system basis. The identification may generate additional sub-sets of spatial information (e.g., shapes), as discussed in reference to FIGS. 5B and 5C.

Figure 7:
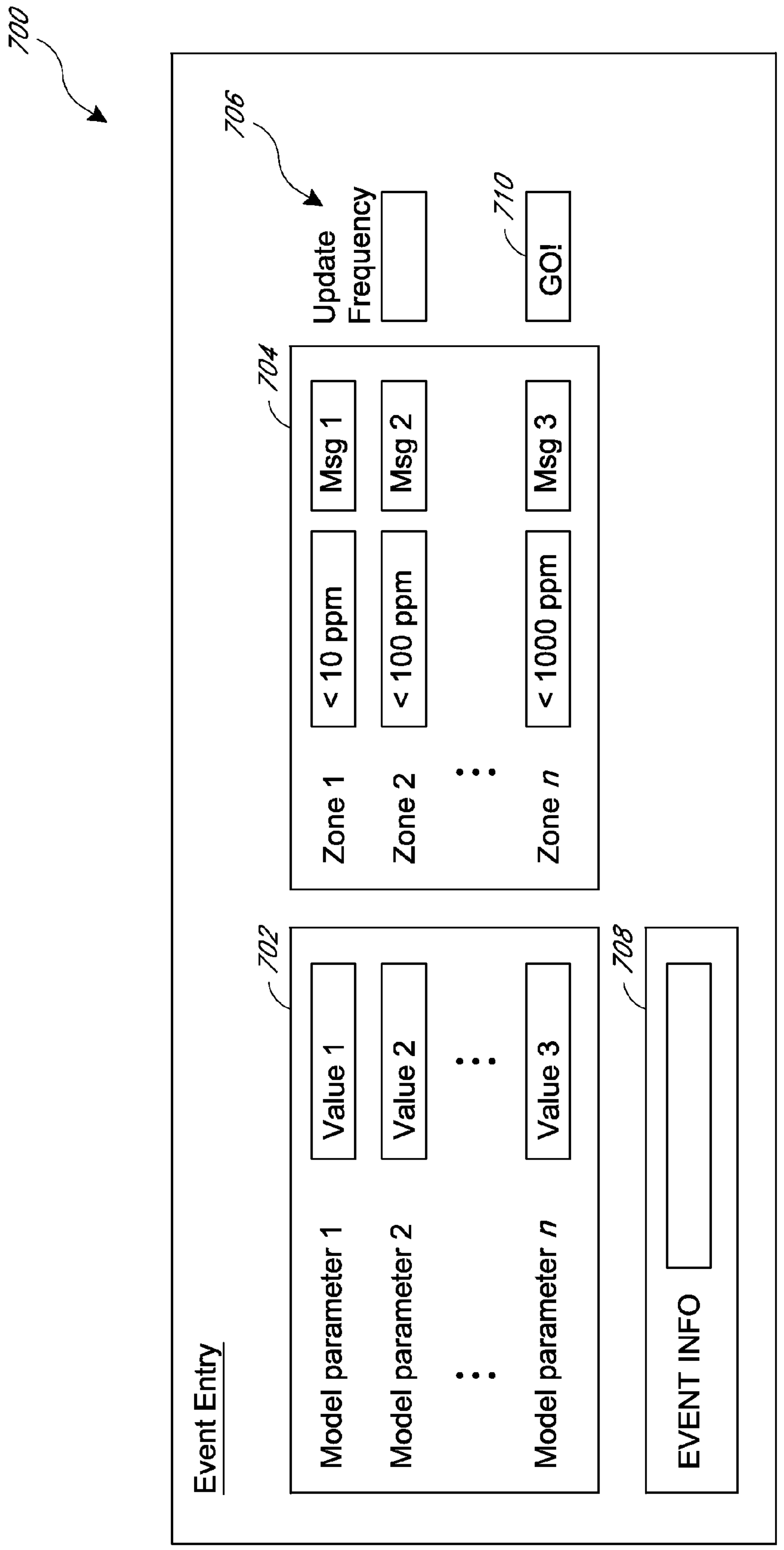
FIG. 7 shows a screen implementation of an example event entry interface.

FIG. 7 shows a screen implementation of an example event entry interface. The event entry interface 700 may include a model parameter entry panel 702. The model parameter entry panel 702 may include one or more model parameters which may be included in an event modeling request. The model parameter entry panel 702 may generate the list of parameters based on the event type (e.g., chemical spill, seismic event, weather event, military event) and/or the target event modeling system.

The event entry interface 700 may include a zone entry panel 704. The zone entry panel 704 may include one or more event effect ranges for the event to be modeled. As shown in FIG. 7, the zones are parts per million (ppm) ranges. In some implementations, the zones are listed from highest danger to lowest. In some implementations, the event entry interface 700 may include a ranking field to receive relative risk ranking for each requested zone. In some implementations, the zone entry panel 704 may include a message field. The message field may be a message to associate with the particular zone. The message may be a textual message, a video message, an audio message, or some combination thereof.

The event entry interface 700 may include an update frequency field 706. The update frequency field 706 may be used to specify how often the spatial notification server wants to receive updated models. In some implementations, the modeling system may be configured to periodically generate spatial information. In such implementations, the update frequency may be provided in the spatial information request. In some implementations, the modeling system may not be configured to periodically generate spatial information. In such implementations, the spatial notification server may submit spatial information requests based on the specified update frequency.

The event entry interface 700 may include an event information panel 708. The event information panel 708 may be configured to receive information about the event such as a textual description of the event, location information, or other data for modeling and/or providing notification information.

The event entry interface 700 may include a button 710 to begin the modeling and notification process. The values included in the event entry interface 700 may be stored in a storage associated with the spatial notification server. The values may be validated. For example, if the zone information includes gaps in the specified ranges, the event entry interface 700 may render an error message and provide an opportunity to receive appropriate ranges.

Figure 8:
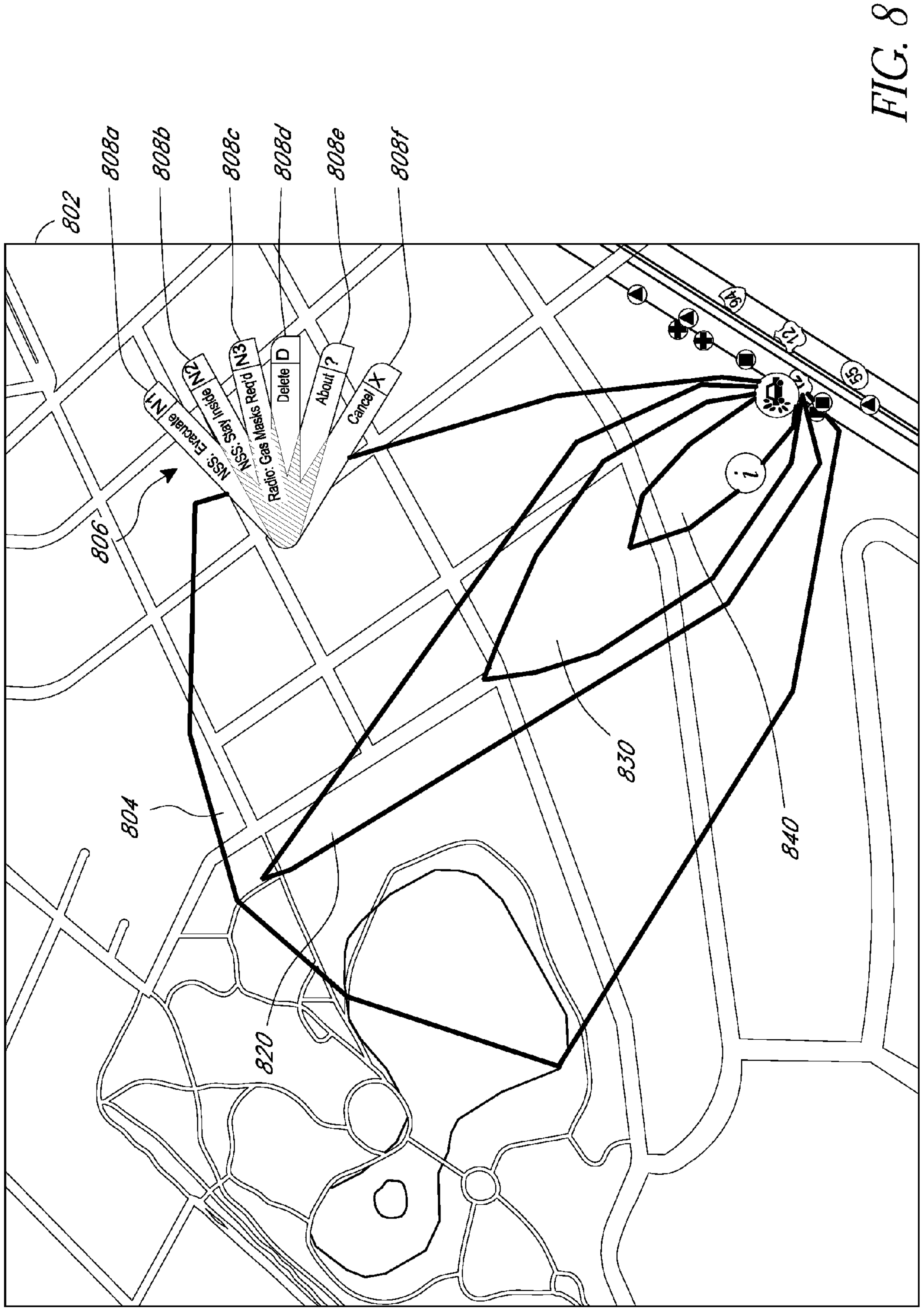
FIG. 8 shows a screen implementation of another exemplary spatial notification system entry interface.

FIG. 8 shows a screen implementation of another exemplary spatial notification system entry interface. The interface of FIG. 8 shows a graphical means for interfacing with the spatial notification system. The interface 800 includes a map base layer 802. Over the map base layer 802, spatial information including four shapes, namely 804, 820, 830, and 840, is shown. In some implementations, an input device may be used to activate a shape. As shown in FIG. 8, shape 804 is activated. Once activated, a menu 806 of options 808*a*, 808*b*, 808*c*, 808*d*, 808*e*, and 808*f* is presented. Options 808*a*, 808*b*, and 808*c* may be used to identify the notification message type for the activated shape. Using an input device, an option is identified and the spatial notification server may be configured to associate the selected notification message type with the activated shape.

As shown in FIG. 8, option 808*d* may be used to delete a shape. For example, a shape may cover an area of such low risk as compared to other shapes that no notification may be sent based on this shape. Accordingly, a shape may be deleted from the model.

As shown in FIG. 8, option 808*e* may be used to cause the spatial notification server to generate additional information about the active shape. The additional information may include the range used to generate the shape (e.g., parts per million), other model parameters used to generate the shape, event information, or other data pertaining to the shape and/or event.

As shown in FIG. 8, option 808*f* may be used to cancel the activation of a shape. Canceling the activation may cause the options to be removed from the interface.

The interface 800 may include other interactive elements such as beacons tracking the location of emergency equipment and/or informational icons. In some implementations, the system may be configured to obtain this information from command and control system. The interface 800 may be included in an event entry interface as shown in FIG. 7.

Figure 9:
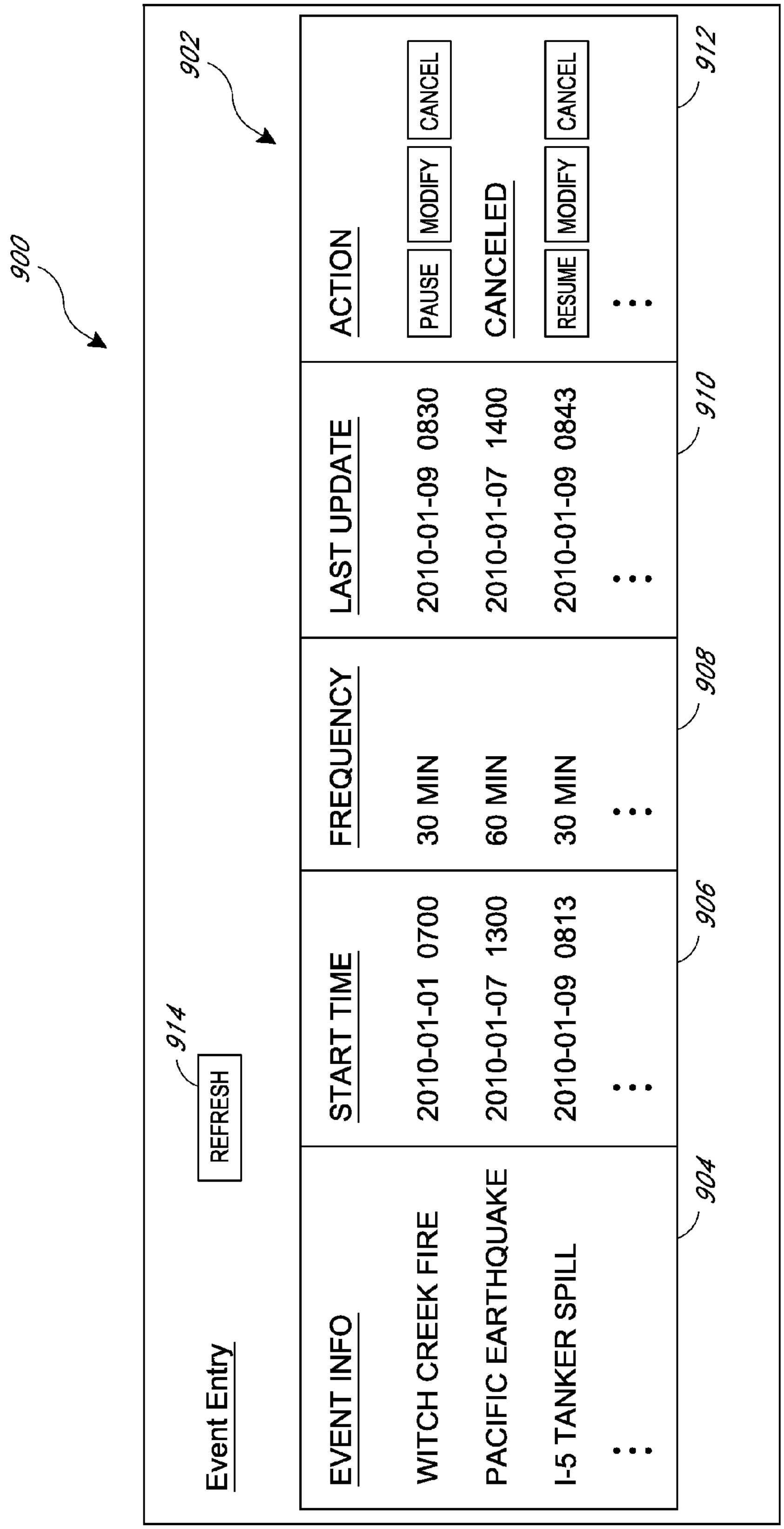
FIG. 9 shows a screen implementation of an example of a spatial notification system event status interface.

FIG. 9 shows a screen implementation of an example of a spatial notification system event status interface. The event status interface 900 may be configured to present information about events processed by the spatial notification system. The event status interface 900 may include a table of events 902. Each row may represent an event. The table of events 902 may include an event information column 904. The event information column may include general information such as a textual description of the event. The table of events 902 may include an event start time column 906. The event start time column 906 may include the time the event occurred or the time the event modeling began. The table of events 902 may include a frequency column 908. The frequency column 908 may include the frequency with which the model information for an event is generated. The table of events 902 may include a last update column 910. The last update column 910 may indicate the last time model information for the event was received by the spatial notification system.

The table of events 902 may include an action column 912. The action column 912 may include one or more controls configured to transmit a signal to the spatial notification system to control the event processing. For example, a pause control may provide a signal to the spatial notification system to pause processing models for the associated event. As another example, a modify control may provide a signal to the spatial notification system to alter the information used for event modeling. In some implementations, this may cause the spatial notification system to render the event entry interface shown in FIG. 7. As a further example, a cancel control may provide a signal to the spatial notification system to stop processing for a given event.

The interface 900 may include a refresh control 914 configured to transmit a signal to the spatial notification system to refresh the event status information. In some implementations, the spatial notification system may be configured to automatically refresh the event status information such as according to a schedule (e.g., every ten minutes). In some implementations, the spatial notification system may be configured to receive status messages associated with an event from the notification delivery system(s) associated with the event. For example, a notification delivery system may transmit a signal indicating the number of notifications that will be sent, the number of notifications successfully sent, the number of notification failures, and the like. Based on such information, the interface 900 may present a notification progress indicator for each event. The indicator may identify an aggregated progress for all notification delivery systems. The indicator may identify individual progress for each notification delivery system. The indicator may identify the progress via a map or other visual medium. For example, areas contacted may be presented with a first color while areas yet to be contacted may be presented with a second color. Other areas may be shaded to indicate failed delivery, subsequent message delivery (e.g., change in risk message), and the like.

Figure 10:
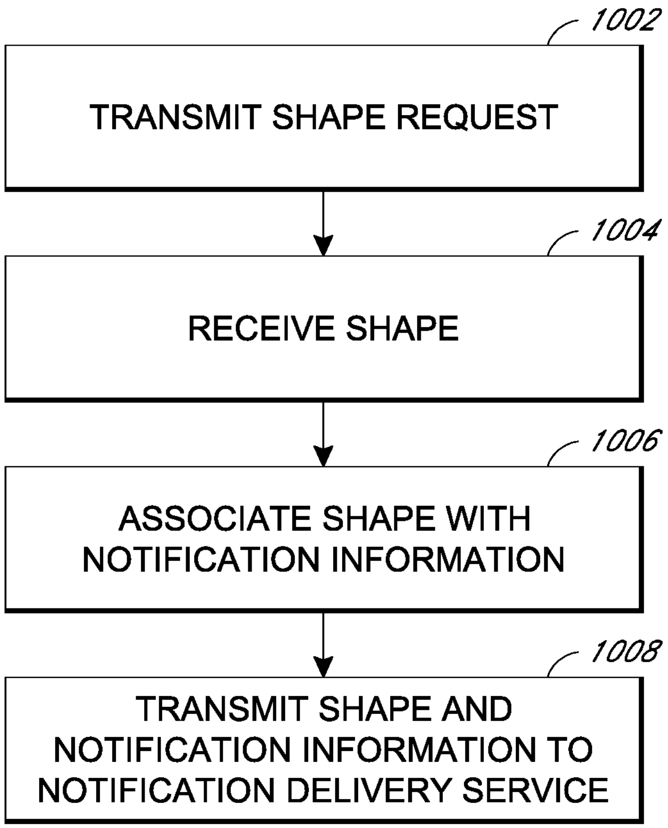
FIG. 10 shows a process flow diagram for another example of a method of generating spatial notifications.

FIG. 10 shows a process flow diagram for another example of a method of generating spatial notifications. The method shown in FIG. 10 may be performed by one or more of the devices described above. For example, the method may be implemented by a spatial notification server as shown in FIG. 3.

The method begins at block 1002 where a request for spatial information is transmitted. The request is based at least in part on a geospatial location. At block 1004, spatial information is received. At block 1006, the spatial information is associated with notification information and a notification delivery service. At block 1008, at least a portion of the spatial information and the associated notification information is transmitted to the notification delivery system.

Figure 11:
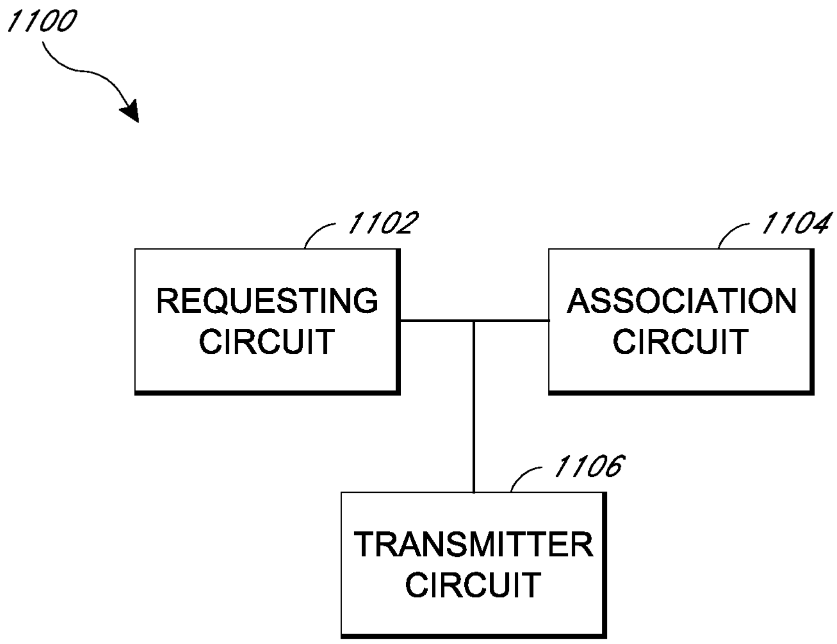
FIG. 11 shows a functional block diagram of another exemplary spatial notification server.

FIG. 11 shows a functional block diagram of another exemplary spatial notification server. It will be understood that a spatial notification server may include more elements than the simplified spatial notification server 1100 shown in FIG. 11. The spatial notification system 1100 may include a requesting circuit 1102, an association circuit 1104, and a transmitter circuit 1106. The spatial notification system 1100 may implement all or part of one or more of the processes described above.

In some implementations, the requesting circuit 1102 may be configured to transmit a request for spatial information based at least in part on a geospatial location. The requesting circuit 1102 may include at least one of a network interface, an antenna, a signal generator, and a processor. In some implementations, the means for transmitting a request for spatial information may include a requesting circuit 1102.

In some implementations, the association circuit 1104 may be configured to associate the spatial information with notification information and a notification delivery service. The association circuit 1104 may include at least one of a processor, a memory, a comparator, an antenna, a receiver, and a signal decoder. In some implementations, the means for associating may include the association circuit 1104.

In some implementations, the transmitter circuit 1106 may be configured to transmit at least a portion of the spatial information and associated notification information to a notification delivery system. The transmitter circuit 1106 may include at least one of a processor, a memory, a signal encoder, an antenna, and a transmitter. In some implementations, the means for transmitting may include the transmitter circuit 1106.

Further implementations of the techniques described herein may be applied to systems engineering such as power plants, vehicles (e.g., airplanes), buildings, or other complex systems. Such systems may include sensors providing data about locations within the plant, vehicle, building, or system. This information may be provided to a modeling system to determine the location of potential problems within the system. The spatial information in these implementations may identify a location within the system which may need inspection, repair, or other attention. Such passive monitoring may be used to identify areas before an event (e.g., meltdown, equipment failure) occurs. The spatial notification system described herein may be configured to transmit the spatial information and notification information to a dispatch system configured to notify the appropriate responsive entity. The spatial notification system may also be used for regulatory purposes by providing the modeled information to one or more agencies.

In some implementations, the spatial notification system may be configured to provide the spatial information to systems other than a notification delivery system. For example, the modeled spatial information may be of interest to a command and control system which may be tasked with responding to the event.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a device as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a device can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A spatial notification system comprising:

a spatial information requesting circuit configured to transmit, in response to receipt of information about an event from a first source, an initial request to a second source for initial spatial information, the initial request including a spatial location, and the initial spatial information comprising at least one of:

a first geographic zone impacted by the event at a first time; and a first geographic area impacted by the event at the first time;

an association circuit configured to associate received initial spatial information with initial notification information and a notification delivery system;

a transmitter configured to transmit at least a portion of the received initial spatial information and associated initial notification information to the notification delivery system, the spatial information requesting circuit further configured to transmit a subsequent request to the second source for subsequent spatial information, the subsequent request including the spatial location, the subsequent spatial information comprising at least one of:

a second geographic zone impacted by the event at a second time after the first time; and a second geographic area impacted by the event at the second time; and a reconciliation circuit configured to generate a comparison between the initial spatial information and the subsequent spatial information, wherein generating the comparison includes:

identifying a zone or an area covered by both the initial spatial information and the subsequent spatial information;

identifying a zone or an area covered by the initial spatial information only; and identifying a zone or an area covered by the subsequent spatial information only, wherein the association circuit is further configured to associate the subsequent spatial information with the subsequent notification information based on the comparison, where the identified zone or area covered by both the initial and subsequent spatial information is associated with a first portion of the subsequent notification information, the identified zone or area covered by the initial spatial information only is associated with a second portion of the subsequent notification information, and the identified area covered by the subsequent spatial information only is associated with a third portion of the subsequent notification information, and wherein the transmitter is further configured to transmit at least a portion of the received subsequent spatial information and associated subsequent notification information to the notification delivery system.

2. The system of claim 1, wherein the spatial information requesting circuit is configured to periodically transmit requests for the spatial information.

3. The system of claim 1, wherein the initial and subsequent notification information comprise a notification type, wherein the notification type includes one of initial notification, stable situation notification, increased risk notification, decreased risk notification, and all clear notification.

4. The system of claim 3, wherein the notification type identifies an appropriate notification message for the initial and subsequent notification information.

5. The system of claim 1, wherein the reconciliation circuit is configured to include an indication of one of increased risk relative to the initial spatial information, decreased risk relative to the initial spatial information, or stable risk relative to the initial spatial information for the second geographic zone or area of the subsequent spatial information.

6. The system of claim 1, wherein the transmitter is configured to transmit the second and third portions of the subsequent notification information to the notification delivery system but not the first portion of the subsequent notification information.

7. The system of claim 1, wherein the second source comprises at least one of an atmospheric dispersion modeling system, a seismic modeling system, a fire modeling system, a weather modeling system, a military modeling system, and an orbital modeling system.

8. The system of claim 1, wherein the spatial information requesting circuit is configured to transmit a request including at least one of wind speed, wind direction, cause of an event, topography, demographics, and frequency.

9. The system of claim 1, further comprising an approval circuit configured to receive a signal authorizing the association between the received spatial information and the notification information, wherein the transmitter is configured to transmit the at least a portion of the received spatial information and associated notification information to a notification delivery system after approval.

10. The system of claim 1, wherein the association circuit is further configured to associate another portion of the received spatial information with another notification delivery system, and wherein the transmitter is further configured to transmit the other portion of the received spatial information and associated notification information to the other notification delivery system.

11. The system of claim 1, wherein the received spatial information includes information identifying a two dimensional shape.

12. The system of claim 1, wherein the received spatial information includes information identifying a three dimensional shape.

13. The system of claim 1, wherein the notification information comprises at least one of a notification message, an indication of risk, a notification priority, and a notification event.

14. A method of spatial notification, comprising:

transmitting, via a transmitter, in response to receipt of information about an event from a first source, an initial request to a second source for initial spatial information, the initial request including a spatial location, and the initial spatial information comprising at least one of:

a first geographic zone impacted by the event at a first time; and a first geographic area impacted by the event at the first time;

receiving, via a receiver, the initial spatial information from the second source;

associating, via a processor, the received initial spatial information with initial notification information and a notification delivery system;

transmitting, via the transmitter, at least a portion of the initial spatial information and associated initial notification information to the notification delivery system;

transmitting, via the transmitter, a subsequent request to the second source for subsequent spatial information, the subsequent request including the spatial location, the subsequent spatial information comprising at least one of:

a second geographic zone impacted by the event at a second time after the first time; and a second geographic area impacted by the event at the second time;

generating, via a reconciliation circuit, a comparison between the initial spatial information and the subsequent spatial information, wherein generating the comparison includes:

identifying a zone or an area covered by both the initial spatial information and the subsequent spatial information;

identifying a zone or an area covered by the initial spatial information only; and identifying a zone or an area covered by the subsequent spatial information only;

associating, via the processor, the subsequent spatial information with the subsequent notification information based on the comparison, where the identified zone or area covered by both the initial and subsequent spatial information is associated with a first portion of the subsequent notification information, the identified zone or area covered by the initial spatial information only is associated with a second portion of the subsequent notification information, and the identified area covered by the subsequent spatial information only is associated with a third portion of the subsequent notification information; and transmitting, via the transmitter, at least a portion of the received subsequent spatial information and associated subsequent notification information to the notification delivery system.

15. The method of claim 14, wherein transmitting the request for a spatial information comprises periodically transmitting a request for the spatial information.

16. The method of claim 14, wherein the initial and subsequent notification information comprise a notification type, wherein the notification type includes one of initial notification, stable situation notification, increased risk notification, decreased risk notification, and all clear notification.

17. The method of claim 16, wherein the notification type identifies an appropriate notification message for the initial and subsequent notification information.

18. The method of claim 14, wherein generating the comparison comprises including an indication of one of increased risk relative to the initial spatial information, decreased risk relative to the initial spatial information, or stable risk relative to the initial spatial information for the second geographic area or zone of the subsequent spatial information.

19. The method of claim 14, wherein transmitting at least a portion of the received subsequent spatial information comprises transmitting the second and third portions of the subsequent notification information to the notification delivery system but not the first portion of the subsequent notification information.

20. The method of claim 14, wherein the second source comprises at least one of an atmospheric dispersion modeling system, a seismic modeling system, a fire modeling system, a weather modeling system, a military modeling system, and an orbital modeling system.

21. The method of claim 14, wherein transmitting a request for spatial information comprises transmitting a request including at least one of a wind speed, wind direction, a cause of an event, a topography, demographics, and a frequency.

22. The method of claim 14, further comprising receiving a signal authorizing the association between the spatial information and the notification information, and wherein transmitting to a notification delivery system includes transmitting the at least a portion of the spatial information and associated notification information to a notification delivery system after approval.

23. The method of claim 14, further comprising:

associating another portion of the spatial information to another notification delivery system; and transmitting the other portion of the spatial information and associated notification information to the other notification delivery system.

24. The method of claim 14, wherein the spatial information includes information identifying a two dimensional shape.

25. The method of claim 14, wherein the spatial information includes information identifying a three dimensional shape.

26. The method of claim 14, wherein the notification information comprises at least one of a notification message, an indication of risk, a notification priority, and a notification event.

27. A non-transitory, computer-readable storage medium comprising instructions executable by a processor of an apparatus, which cause the apparatus to:

transmit, in response to receipt of information about an event from a first source, an initial request to a second source for initial spatial information, the initial request including a spatial location, and the initial spatial information comprising at least one of:

a first geographic zone impacted by the event at a first time; and a first geographic area impacted by the event at the first time;

receive the initial spatial information from the second source;

associate the received initial spatial information with initial notification information and a notification delivery system;

transmit at least a portion of the initial spatial information and associated initial notification information to the notification delivery system;

transmit a subsequent request to the second source for subsequent spatial information, the subsequent request including the spatial location, the subsequent spatial information comprising at least one of:

a second geographic zone impacted by the event at a second time after the first time; and a second geographic area impacted by the event at the second time;

generate a comparison between the initial spatial information and the subsequent spatial information, wherein generating the comparison includes:

identifying a zone or an area covered by both the initial spatial information and the subsequent spatial information;

identifying a zone or an area covered by the initial spatial information only; and identifying a zone or an area covered by the subsequent spatial information only;

associate the subsequent spatial information with the subsequent notification information based on the comparison, where the identified zone or area covered by both the initial and subsequent spatial information is associated with a first portion of the subsequent notification information, the identified zone or area covered by the initial spatial information only is associated with a second portion of the subsequent notification information, and the identified area covered by the subsequent spatial information only is associated with a third portion of the subsequent notification information; and transmit at least a portion of the received subsequent spatial information and associated subsequent notification information to the notification delivery system.

28. A spatial notification system comprising:

means for transmitting, in response to receipt of information about an event from a first source, an initial request to a second source for initial spatial information, the initial request including a spatial location, and the initial spatial information comprising at least one of:

a first geographic zone impacted by the event at a first time; and a first geographic area impacted by the event at the first time;

means for associating received initial spatial information from the second source with initial notification information and a notification delivery system;

means for transmitting at least a portion of the received initial spatial information and associated initial notification information to the notification delivery system;

the request transmitting means configured to transmit a subsequent request to the second source for subsequent spatial information, the subsequent request including the spatial location, the subsequent spatial information comprising at least one of:

a second geographic zone impacted by the event at a second time after the first time; and a second geographic area impacted by the event at the second time; and means for generating a comparison between the initial spatial information and the subsequent spatial information, wherein generating the comparison includes:

identifying a zone or an area covered by both the initial spatial information and the subsequent spatial information;

identifying a zone or an area covered by the initial spatial information only; and identifying a zone or an area covered by the subsequent spatial information only;

the means for associating configured to associate the subsequent spatial information with the subsequent notification information based on the comparison, where the identified zone or area covered by both the initial and subsequent spatial information is associated with a first portion of the subsequent notification information, the identified zone or area covered by the initial spatial information only is associated with a second portion of the subsequent notification information, and the identified area covered by the subsequent spatial information only is associated with a third portion of the subsequent notification information, and the portion transmitting means configured to transmit at least a portion of the received subsequent spatial information and associated subsequent notification information to the notification delivery system.

* * * * *